US009056325B2

(12) United States Patent
Torontow

(10) Patent No.: US 9,056,325 B2
(45) Date of Patent: Jun. 16, 2015

(54) MULTI-NOZZLE MISTING SHOWER HEAD

(76) Inventor: Shahn Torontow, Victoria (CA)

( * ) Notice: Subject to any disclaimer, the term of this patent is extended or adjusted under 35 U.S.C. 154(b) by 464 days.

(21) Appl. No.: 13/417,472

(22) Filed: Mar. 12, 2012

(65) Prior Publication Data

US 2012/0228407 A1 Sep. 13, 2012

Related U.S. Application Data

(60) Provisional application No. 61/451,914, filed on Mar. 11, 2011.

(51) Int. Cl.
*B05B 1/30* (2006.01)
*A62C 31/02* (2006.01)
*F16K 31/00* (2006.01)
*B05B 1/18* (2006.01)

(52) U.S. Cl.
CPC ................. *B05B 1/18* (2013.01); *B05B 1/3013* (2013.01); *B05B 1/3033* (2013.01); *B05B 1/3046* (2013.01); *B05B 1/185* (2013.01); *B05B 1/304* (2013.01)

(58) Field of Classification Search
CPC ........ B05B 1/3013; B05B 1/18; B05B 1/304; B05B 1/3033; B05B 1/3046
USPC ........ 239/443, 580, 583, 581.1, 581.2, 582.1, 239/548–568, 99, 100, 449, 456–458; 251/340, 122, 309, 312, 324, 318–334
See application file for complete search history.

(56) References Cited

U.S. PATENT DOCUMENTS 173,388 A * 2/1876 Carmody ...................... 239/538
542,709 A * 7/1895 Linke ............................ 251/340
721,665 A * 3/1903 Busha ........................... 239/441
903,451 A * 11/1908 Clark ............................ 251/340
2,156,800 A 10/1936 Bucknell
2,359,455 A * 10/1944 Williamson .................. 239/449
2,623,789 A * 12/1952 Bourner ........................ 239/538
2,756,108 A * 7/1956 Warren ......................... 239/457
2,936,960 A * 5/1960 Thompson .................... 239/458
3,116,880 A * 1/1964 Kuiken ......................... 239/539
3,252,660 A 5/1966 Hyde
3,887,136 A * 6/1975 Anderson ..................... 239/460
4,043,337 A * 8/1977 Baugher ....................... 604/150
4,426,040 A * 1/1984 Smith ........................ 239/428.5
4,580,751 A 4/1986 Panzer
4,614,303 A 9/1986 Moseley, Jr.
4,657,185 A 4/1987 Rundzaitis
6,170,765 B1 * 1/2001 Gil et al. ....................... 239/539
6,328,228 B1 12/2001 Bossini
6,550,697 B2 * 4/2003 Lai ................................ 239/446
2012/0318391 A1 * 12/2012 Zhou et al. ............... 137/625.46

* cited by examiner

*Primary Examiner* — Len Tran
*Assistant Examiner* — Alexander Valvis

(57) ABSTRACT

Disclosed is a misting shower head having a plurality of atomizing, solid cone spray nozzles for providing a soft showering device adapted to reduce water consumption and reduce the size and intensity of outgoing water droplets. The shower head comprises a housing having a fluid inlet directing water to a plurality of spray nozzles. The flow rate entering the housing is controlled by a straight through valve that is adjustable via a dual-handled arm that actuates the valve stopper mechanism, and thus varies the rate of fluid entering the shower head housing. The nozzles break up the flow of water into atomized droplets and increase the projected area in which the water is dispersed therefrom. The atomized spray from all nozzles creates a uniform cone of low intensity water, which reduces point pressure associated with higher intensity shower heads for treating sore muscles or experiencing an encompassing mist of water.

6 Claims, 3 Drawing Sheets

MULTI-NOZZLE MISTING SHOWER HEAD

CROSS REFERENCE TO RELATED APPLICATION

This application claims the benefit of U.S. Provisional Application No. 61/451,914 filed on Mar. 11, 2011, entitled "Mister Handy Shower."

BACKGROUND OF THE INVENTION

1. Field of the Invention

The present invention relates to shower heads and misting devices. More specifically, the present invention pertains to a misting shower head that reduces water consumption, softens the distributed water and further provides a novel construction for the purposes of creating a wide spray-mist in which a user can utilize to shower or to distribute water onto a target using a wide spray pattern.

2. Description of the Prior Art

Shower heads and spray nozzle devices are well known in the art for the purposes of providing a stream of water from a water source and in a specific pattern to suit a user's needs. These include specific patterns having a given water pressure, drop size and flow rate for the purpose of showering or distributing water onto an individual or target. Traditional shower heads utilize a predefined flow rate or a pattern of water distribution in which to shower a user. Most utilize nozzle fittings in which water is projected in large droplets, in continuous streams or with increased velocity with respect to the given water supply. These shower heads provide a penetrating flow of water that is useful for forcefully removing dirt and soap, and further for providing a massaging shower experience. However, these types of shower devices can be particularly painful for those users who are more sensitive or those who are recovering from an injury.

The present invention contemplates a new shower head in which projected water is provided in an evenly distributed cone pattern and in a fine-mist spray, which envelopes a user and reduces the point pressure associated with higher intensity and larger droplet water streams. The present invention provides a plurality of atomizing spray nozzles and a rearward valve in which control the outgoing water flow rate and the shower intensity. The spray nozzles produce a uniform cone of mist in which particularly fine water droplets are projected onto a user to create a soft shower experience, and one that can be utilized for showering those with sensitive skin, injury or those that prefer a mist shower over an intense, penetrating stream of water. The present invention is further provided to reduce the quantity of water utilized for a given shower period, wherein the projected mist utilizes smaller water droplets and reduced outflow of fluid as compared to a traditional shower head device. In this way, water is conserved relative to a higher intensity shower.

Several shower heads have been disclosed in the prior art, including those that have been patented or disclosed in published patent applications. These devices have familiar design elements for the purposes of creating a fine mist spray shower head or one in which provides several shower modes; however the structure and intent of these devices differs from the present invention. The present invention provides a unique, atomizing spray pattern and means of adjusting the mist intensity flowing from the shower head. Water is conserved and the intensity of the shower is thereby controllable for a given user. The devices deemed most relevant to the present disclosure are provided below.

Specifically, U.S. Pat. No. 4,426,040 to Smith discloses an adjustable, aerating shower head device that provides an atomized spray to form a continuously expanding pattern of water concentration. This facilitates removal of shampoo from one's hair using an aerated mist of shower water. Adjustment if accomplished by manipulating the position of a transverse orifice nozzle plate along the axis of an outlet passageway of the shower head. The Smith device describes a water saving, misting shower head of similar intent as the present invention; however its structure diverges with respect to its nozzle design and means of adjusting water flow rate. The present invention provides a shower head housing having a plurality of nozzles that provide an atomized spray, while a dual-sided handle is utilized to modulate the flow rate and even shut off the water supply if desired.

Another such device is U.S. Pat. No. 4,614,303 to Moseley, Jr., wherein a self-cleaning, water saving shower head is disclosed wherein outgoing flow rate may be adjusted to a fine mist spray to a heavy, pulsating rinse stream. The device utilizes a first and second cavitation inducing orifice having an elongated mixing chamber therebetween to regulate the flow of water and provide a self-cleaning scouring action against lime and mineral deposits without utilizing moving or mechanical parts to do so. The Moseley, Jr. device provides a novel self-cleaning and fluid regulating device that differs in construction from the present invention. The present invention utilizes a shower head housing that directs the flow of fluid to a plurality of connected nozzles, while a straight through plunger valve provides a means to adjust the intensity of the water through the shower head, and thus the intensity of the outgoing mist of shower water.

Finally, U.S. Pat. No. 3,252,660 to Hyde and U.S. Pat. No. 6,328,228 to Bossini disclose shower head devices having flow adjustment mechanisms related to the present invention. The Bossini patent discloses a shower for the delivery of differentiating jets of water to generate and deliver atomized jets of water governed by a rotating distribution element. The Hyde device discloses a shower head that is readily adjustable by the user to vary the flow of water therethrough, comprising a nozzle part that is closeable to adjust intensity and water flow rate. Both of these devices relate to shower heads having either a misting function or flow rate control, however these devices lack the structure of the present invention, wherein a relatively simple housing architecture provides flow to a plurality of atomizing nozzles, while a flow control valve allows a user to adjust the intensity of the outgoing spray mist.

The present invention provides a soft, misting spray shower experience that is suitable for conserving water and providing a soothing application of water in a mist or atomized state. The mist reduces the impact pressure of higher intensity and larger droplet shower heads, and further provides a simple construction such that flow is controlled and an expanding cone of spray mist is provided within a shower stall for washing purposes. The structure and spirit of the present invention substantially diverges in design elements from the prior art, and consequently it is clear that there is a need in the art for an improvement to existing misting shower head devices. In this regard the instant invention substantially fulfills these needs.

SUMMARY OF THE INVENTION

In view of the foregoing disadvantages inherent in the known types of shower head devices now present in the prior art, the present invention provides a new misting spray shower head wherein the same can be utilized for providing convenience for the user when providing a soft, cone-shaped mist of spray for showering, while carefully controlling water usage.

It is therefore an object of the present invention to provide a new and improved spray shower head device that has all of the advantages of the prior art and none of the disadvantages.

It is another object of the present invention to provide a shower head device having a plurality of atomizing spray nozzles that create an expanding cone of shower mist in which to bathe a user, wherein said spray mist is adapted to provide a soft, enveloping mist within a shower to replace more intense, larger droplet shower head devices.

Another object of the present invention is to provide shower head with an adjustable valve, wherein flow to the shower head is controllable by a dual-handled control in which flow rate can be modulated or shut off from entering the shower head nozzles.

Yet another object of the present invention is to provide a shower head devices that can be utilized as a handheld attachment or replacement for an existing shower arm.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 2:
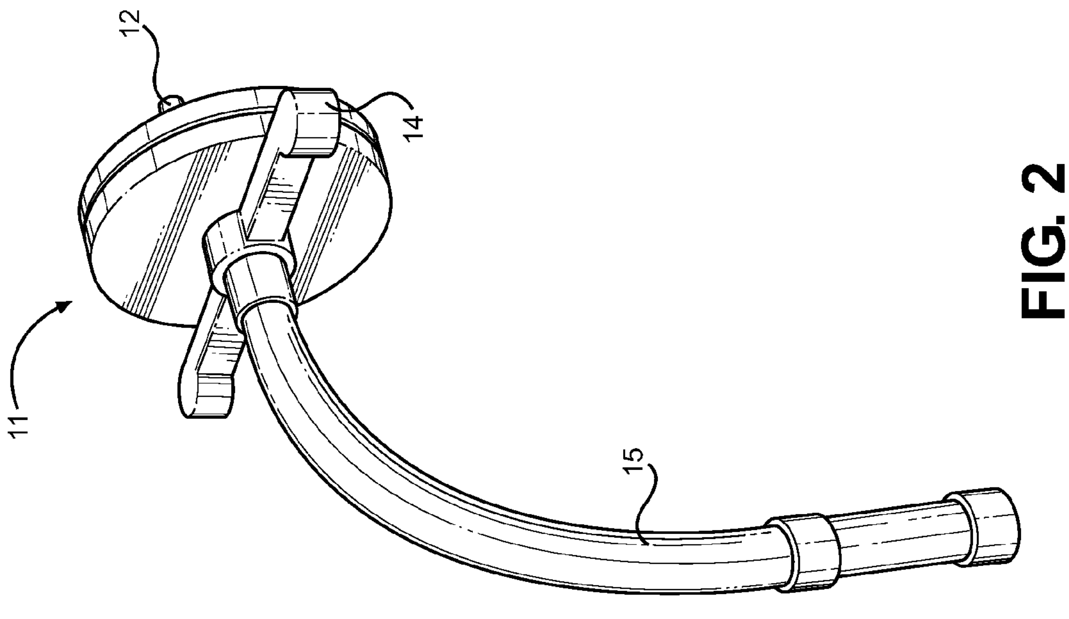
FIG. 2 shows a rear overhead perspective view of the shower head device.

Reference is made herein to the attached drawings. Like reference numerals are used throughout the drawings to depict like or similar elements of the misting shower head device. For the purposes of presenting a brief and clear description of the present invention, the preferred embodiment will be discussed as used for creating a cone of mist within shower and for reducing water consumption. The figures are intended for representative purposes only and should not be considered to be limiting in any respect.

Figure 1:
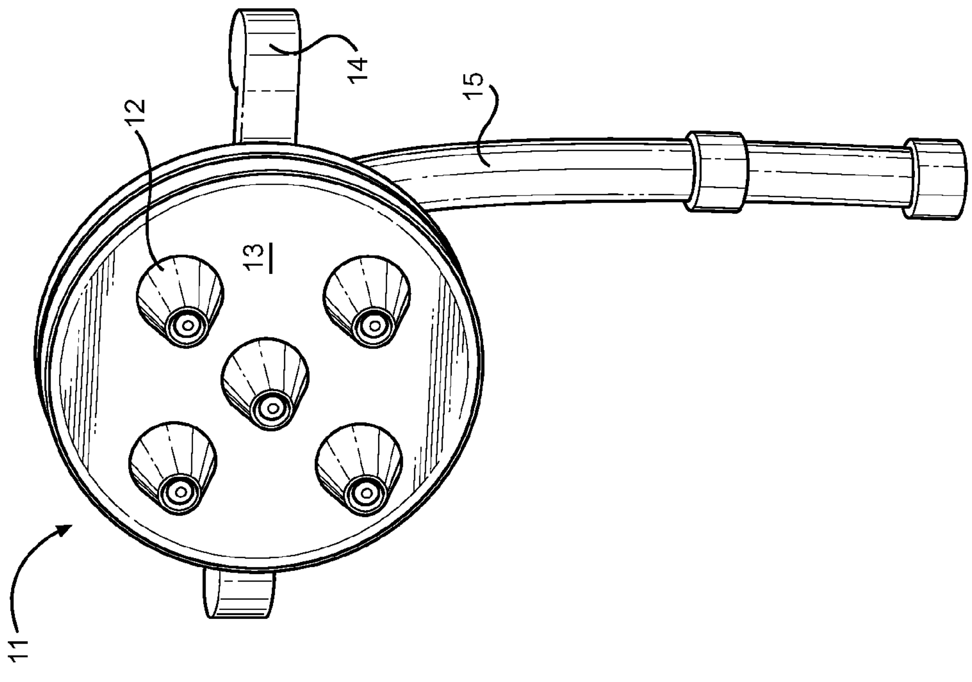
FIG. 1 shows a frontal perspective view of the shower head device.

Referring now to FIG. 1, there is shown a frontal perspective view of the misting shower head device of the present invention. The shower head comprising a housing 11 having a plurality of misting nozzles 12 provided on its forward surface 13. The misting nozzles 12 are preferably solid cone, atomizing spray nozzles that reduce inflowing water from the shower arm 15 into very fine droplets, and further disperse the droplets into a conical formation having an increasing diameter as the spray moves away from the shower head 11. The shower head housing 11 comprises a plurality of water conduits that feed inflowing water uniformly to the plurality of nozzles 12 provided on the device. Along the backside of the housing 11 is provided a flow control handle 14, comprising a dual-handled device that can be rotated with respect to the shower arm 15 to open and close an internal valve that acts as a flow limiter into the shower head housing 11. The dual-arm nature of the handle 14 permits control over the shower head during use with either or both hands, while the handle 14 can be rotated from either side of the housing 11 to increase or decrease the flow rate from the shower head nozzles 12.

The goal of the present invention is twofold: first, to create a static shower head or handheld shower head that reduces water consumption while in use, while at the same time supplying adequate flow rate to facilitate lather development and subsequent removal there; second, to further create a product that reduces physical impact of the water supply onto an individual that is typical of standard shower heads and hand showers. Typical shower heads create a continuous stream or larger droplet water supply that may be supplied at a higher intensity than desired. Generally the flow rate through these shower heads is not easy to control, while the size of the droplets is completely uncontrollable. The present invention creates a cone of atomized spray, wherein the droplets are very fine and supplied at a desired intensity as determined by the valve position behind the shower head housing. Those with low pain thresholds because of age, injury or disease may find particular benefits to this device, while those environmentally or economically mindful users can cease the flow of water between application and subsequent removal of soap during a shower.

Figure 3:
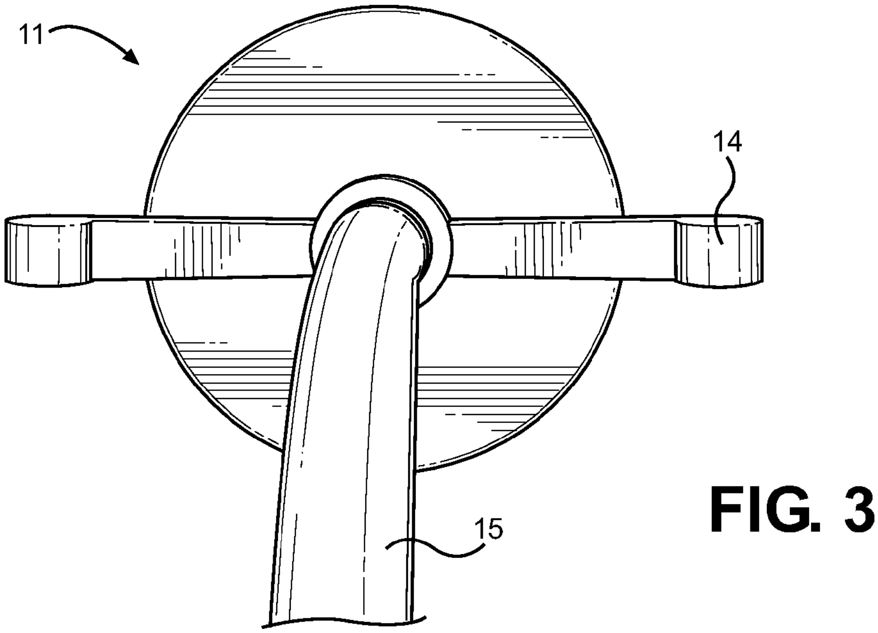
FIG. 3 shows a rear view of the shower head device.

Referring now to FIGS. 2 and 3, there are shown rear perspective views of the misting spray shower head of the present invention. The present shower head device is adapted to be provided as a handheld attachment, wherein the shower head may be directly to a convenient location on a user's body, or preferably may be statically connected to a shower head arm 15 that attaches to a shower wall and allows for the flow of water therethrough. The rear flow control handle 14 is rotatably mounted behind the showerhead housing 11, along a connecting region that allows connection to the shower head arm 15. The handle 14 rotates about the connection region to translate a valve stopper in or out of a diaphragm aperture, regulating the flow of water from the arm 15, through the connecting region and into the shower head housing 11 and to the nozzles 12. The dual-sided nature of the handle is particularly useful for those with reduced motor function or dexterity, as the handle is large, outwardly extending and an easy means to control the shower head direction. The handle also provides an easy means to regulate the flow of water from the nozzles. This regulation reduces the spray intensity and volume of fluid consumed, providing an efficient use of water and a softer spray of mist onto the user.

Water is an ever reducing commodity. It is realized that individuals need to reduce consumption in order to preserve fresh water supplies and prevent shortages. It is also realized that water costs may be curtailed through more efficient showering systems. Standard shower heads and hand showers utilize a flow rate approximately 1.8 GPM (gallons per minute) or more during operation. They produce continuous or large droplet streams of water which consume large quantities of water during a showering activity. The present invention is intended to reduce consumption, while also softening the otherwise penetrating stream of fluid from most common shower heads, which can be painful point pressure locations upon impact with the body and in particular for impaired or injured individuals.

Figure 4:
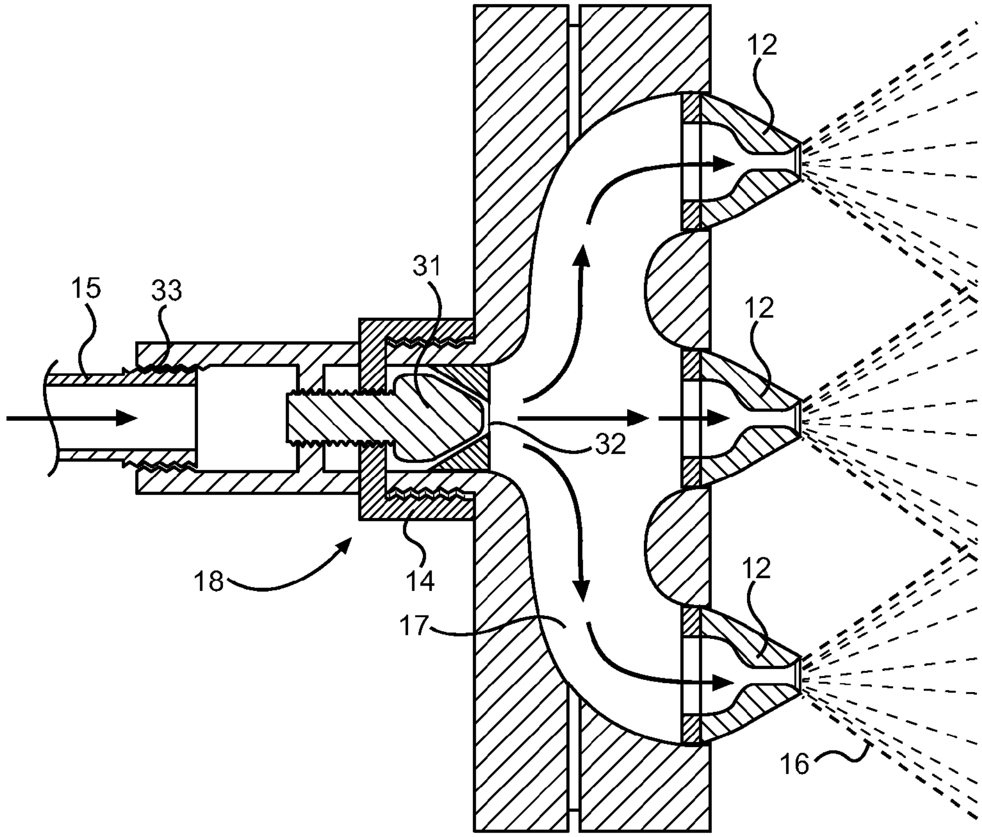
FIG. 4 shows a cross-section view of the shower head device.

Referring now to FIG. 4, there is shown a cross section view of the present misting shower head housing of the present invention. The rear portion of the shower head housing 11 is adapted to be threadably engaged 33 to a shower arm

15 or flexible attachment hose if a handheld version is preferred. The housing 11 attaches to the shower arm 15 via a connection region 18 defined by a threaded engagement 33 and an internal valve controlled by the user handle 14. Flow to the shower head 11 is controlled by positioning of the valve plunger 31 within a tapering aperture 32, which allows for a greater or reduced opening to the internal conduits within the shower head housing. The plunger 31 employs a threaded shank portion, which is threadably supported by a rear engagement region and the threaded portion of the user handle 14. Rotation of the user handle 14 acts as a turn screw or worm gear to advance the plunger 31 into or away from the valve aperture 32, varying flow rate and thus the intensity of the shower head droplets.

Within the housing 11 is a plurality of fluid conduits that uniformly route water from the valve aperture 32 and to the plurality of attached nozzles 12. The nozzles are preferably solid cone spray nozzles 12 that produce a finely and uniformly distributed spray of atomized water therefrom as water passes from the housing and through the nozzle bodies. These nozzles 12 release a fraction of water when compared to traditional showerheads, which reduces consumption and creates a uniform mist of atomized spray to meet most showering needs. Rotation of the user handle 14 changes the valve position behind the shower head housing and thus the water flow rate and exit pressure. Updating the flow changes the dynamics of the nozzle, customizing the flow output to meet a particular individual's needs and preferences. The use of solid cone nozzles is contemplated to reduce the outgoing water droplet size as it passes through the nozzles such that output is a very fine spray, as opposed to distribution of large water droplets. This results in an output of finely sprayed mist or atomized spray that fills a shower area with an increasing cone 16 of water, as opposed to multiple streams of droplets that leave areas uncovered within a shower.

Figure 5:
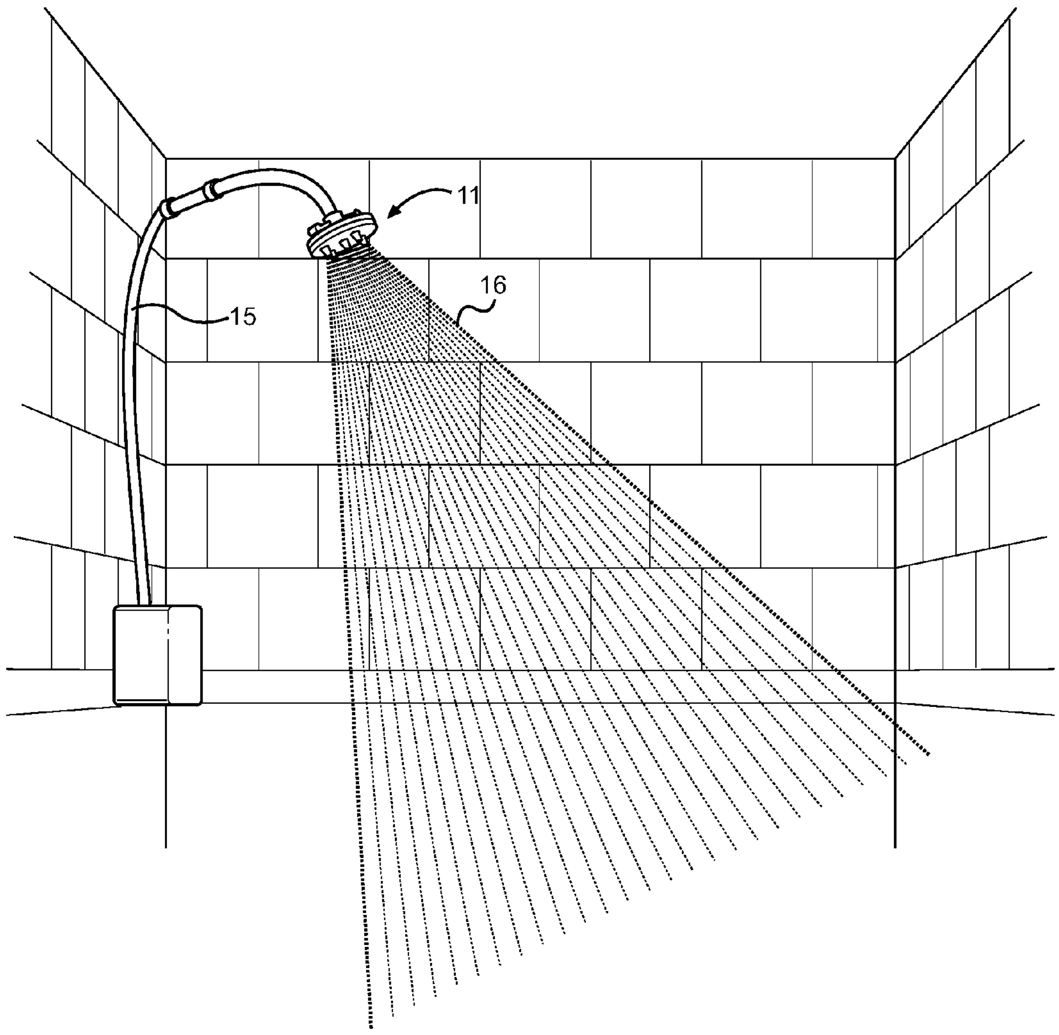
FIG. 5 shows the shower head device in a working position, creating an outwardly expanding cone of spray mist.

Referring now to FIG. 5, there is a perspective view of the shower head of the present invention in a working position, wherein the spray cone 16 is illustrated and the shower head 11 is in operation. As shown, the outgoing mist from the shower head nozzles creates a broad coverage area that quickly mists the entire shower area, depending on the size of the shower and the number of nozzles provided. Most currently available shower heads have a plurality of functions, including fine spray, massage, hard, rain shower, mist. However, none have been provided that meet the goals of the present invention, which include a simply constructed, easily operated shower head that conserves water and provides a spray mist using solid cone nozzles. Solid cone nozzles provide a uniform mist of spray shower, which atomizes the outgoing fluid into minute droplets for reduced point pressure and increased misting.

The present invention is specifically designed to reduce the physical impact and consumption of shower water. The device comprises a shower head containing several nozzles that atomize outgoing water while a mechanism for controlling flow rate is provided. The nozzles emit water in a conical, finely distributed pattern, while the flow rate may be ceased or regulated as necessary to meet a user's needs. The nozzles reduce the size of the water droplets, thereby reducing the usage and impact of water dispensed through the cones, while the flow control valve reduces overall flow rate from the shower head. The control handle or lever operates the control valve and is conveniently located behind and protruding from the spray head housing, such that people with a disability or impairment can easily adjust the outgoing flow rate and pressure. The location and size of the lever is important for visual reference for different users, wherein its dual-handled design allows grip and control from either side of the housing.

For individuals suffering from illnesses, injuries, or age-related sensitivity problems, the large drops of water produced by these traditional shower units can be very painful. The present invention provides a fine, atomized cone of spray mist that is softer against a user's skin than traditional shower head devices. For those wishing to reduce water consumption for environmental or economic considerations, there present invention provides a reduced and controllable flow rate shower head that is convenient for showering while reducing overall water usage. Finally, the construction of the present invention is simple, requiring minimal moving mechanisms to affect a spray pattern, and one that can easily be installed as a static shower head or handheld device.

In light of the present disclosure and the foregoing prior art, it is submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A misting shower head device, comprising:

a shower head housing having a plurality of nozzles on a front surface of the shower head housing, a plurality of fluid conduits within said shower head housing each connecting said plurality of nozzles to a shower arm connection region;

said shower arm connection region comprising a flow control handle, a flow control valve and a shower arm connection means;

said flow control valve configured to control fluid flow into said plurality of fluid conduits, wherein said flow control valve further comprises a threaded shank attached to a plunger that is removably disposed within a valve aperture onto a valve seat within said shower arm connection region for controlling the flow of liquid there through, said flow control handle advances said threaded shank upon rotation of said flow control handle about a longitudinal axis of said shower arm connection region thereby opening and closing the flow control valve, wherein rotation of said flow control valve adjusts a water flow rate and an exit pressure;

each of said plurality of nozzles comprising a solid cone, atomizing spray nozzles having a converging portion followed by a throat portion and followed by a diverging portion which outputs a spray cone mist; and, said flow control handle having at least two outwardly projecting handle arms disposed directly behind the shower head housing wherein the handle arms extend passed an outer perimeter of the showerhead housing such that they are able to be grasped in order to rotate said flow control handle.

2. The misting shower head device of claim 1, wherein said shower arm connection region is configured to connect to a static shower arm.

3. The misting shower head device of claim 1, wherein said shower arm connection region is configured to connect to a flexible hose for a handheld configuration.

4. The misting shower head device of claim 1, wherein said flow control valve is configured to seat on a tapering aperture.

5. The misting shower head device of claim 1, wherein said flow control valve is configured to seat on a diaphragm aperture.

6. The misting shower head device of claim 1, wherein said at least two outwardly projecting handle arms on said flow control handle are disposed on opposing sides of said flow control handle.

* * * * *